United States Patent
Chen et al.

(10) Patent No.: US 9,811,278 B2
(45) Date of Patent: Nov. 7, 2017

(54) METHOD, SYSTEM AND APPARATUS FOR PREDICTING ABNORMALITY

(71) Applicant: Wistron Corporation, New Taipei (TW)

(72) Inventors: Chih-Ming Chen, New Taipei (TW); Hsiao-Wen Tin, New Taipei (TW)

(73) Assignee: Wistron Corporation, New Taipei (TW)

( * ) Notice: Subject to any disclaimer, the term of this patent is extended or adjusted under 35 U.S.C. 154(b) by 255 days.

(21) Appl. No.: 14/923,446

(22) Filed: Oct. 27, 2015

(65) Prior Publication Data
US 2017/0010829 A1 Jan. 12, 2017

(30) Foreign Application Priority Data
Jul. 6, 2015 (TW) .............................. 104121840 A

(51) Int. Cl.
*G06F 3/06* (2006.01)
(52) U.S. Cl.
CPC .......... *G06F 3/0622* (2013.01); *G06F 3/0637* (2013.01); *G06F 3/0673* (2013.01)
(58) Field of Classification Search
CPC ..... G06F 3/0622; G06F 3/0637; G06F 3/0673
See application file for complete search history.

(56) References Cited

U.S. PATENT DOCUMENTS

| 8,468,595 B1 * | 6/2013 | Huang ................... G06F 21/54 726/1 |
| 8,474,032 B2 | 6/2013 | Fetik |
| 2006/0026669 A1 | 2/2006 | Zakas |
| 2010/0122120 A1 | 5/2010 | Lin |
| 2011/0067025 A1 * | 3/2011 | Cragun ............... G06F 9/45512 718/100 |
| 2014/0020083 A1 | 1/2014 | Fetik |

FOREIGN PATENT DOCUMENTS

| TW | 200618565 | 6/2006 |
| TW | 201019104 | 5/2010 |

OTHER PUBLICATIONS

"Office Action of Taiwan Counterpart Application", dated Apr. 25, 2016, with English translation thereof, p. 1-p. 17.

* cited by examiner

*Primary Examiner* — Hiep Nguyen
(74) *Attorney, Agent, or Firm* — JCIPRNET

(57) ABSTRACT

A method, a system and an apparatus for predicting abnormalities are provided. A controller analyzes a plurality of command logs to obtain a predictive rule for accessing a storage device. The controller performs an anomaly detection for the command logs based on the predictive rule so as to obtain at least one command cluster. The controller establishes policy data corresponding to the predictive rule based on the command logs included in each command cluster, and sends the policy data to a data transmission interface coupled to the storage device. The data transmission interface obtains a processing action for a received data access command according to the policy data.

20 Claims, 5 Drawing Sheets

METHOD, SYSTEM AND APPARATUS FOR PREDICTING ABNORMALITY

CROSS-REFERENCE TO RELATED APPLICATION

This application claims the priority benefit of Taiwan application serial no. 104121840, filed on Jul. 6, 2015. The entirety of the above-mentioned patent application is hereby incorporated by reference herein and made a part of this specification.

BACKGROUND

Field of the Disclosure

The disclosure is related to a data security mechanism, and particularly related to a method, system and an apparatus for predicting abnormality.

Description of Related Art

With rapid development of Internet technology, Internet has become an alternative medium for transmitting and exchanging information. While Internet expedites information exchange worldwide, more and more people develop the habit of carrying out communication in the virtual world apart from the real world. In the meantime, there is an increasing number of people who make malicious attack through the Internet. To block malicious attack, a firewall technology has been developed. Firewall is a mechanism that helps to ensure information security by permitting or restricting data transmission based on specific rules. Accordingly, it is an important issue in the field to design a good firewall.

SUMMARY

The disclosure provides a method, system and an apparatus for predicting abnormality by separating a controlling layer from a data layer, which simplifies the processing procedure.

In the disclosure, an abnormality predicting method includes analyzing a plurality of command logs via a controller to obtain at least one predictive rule for accessing a storage device; performing an anomaly detection for the command logs via the controller based on the at least one predictive rule so as to obtain at least one command cluster; establishing policy data corresponding to the predictive rule via the controller based on one or more command logs in each command cluster; sending the policy data to a data transmission interface coupled to the storage device via the controller, and obtaining a processing action for a received data access command via the data transmission interface according to the policy data.

In an embodiment of the disclosure, each policy data includes a security rule and a corresponding processing action. The step of obtaining the processing action for the received data access command via the data access interface according to the policy data includes a step of retrieving a processing action corresponding to the security rule that matches the data access command.

In an embodiment of the disclosure, after the controller sends the policy data to the data transmission interface coupled to the storage device, the data transmission interface transforms the policy data into a format that complies with a store table of the data transmission interface so as to write the policy data into the store table. The step of writing the policy data into the store table includes writing the security rule into a rule field; writing the processing action into the action field, wherein the store table further includes a status field which records a number of times that the data transmission interface receives the data access command.

In an embodiment of the disclosure, the step of obtaining the processing action for the received data access command via the data transmission interface according to the policy data includes that the data transmission interface determines whether the received data access command matches the security rule recorded in the rule field. If the received data access command does not match any security rule, the data access command is not executed. If the received data access command matches the security rule, the data transmission interface reads a corresponding action field to obtain the processing action.

In an embodiment of the disclosure, after the data transmission interface obtains the processing action for the received data access command according to the policy data, if the processing action is an active action, the data transmission interface executes an access action corresponding to the data access command for the storage device. If the processing action is a filter action, the data transmission interface adjusts the content of the data access command and then executes an access action corresponding to the adjusted data access command for the storage device. If the processing action is a block action, the data transmission interface isolates the data access command such that the data transmission interface does not execute the data access command.

In an embodiment of the disclosure, if the processing action is the block action, the data transmission interface forwards the data access command to the controller or another data transmission interface.

In an embodiment of the disclosure, after the data transmission interface receives the data access command, the data transmission interface accumulates the number of times in a corresponding status field and sends the number of times to the controller such that the controller updates the policy data.

In an embodiment of the disclosure, the storage device includes a plurality of storage spaces. Each storage space has at least one corresponding policy data.

In an embodiment of the disclosure, the step of analyzing the command logs via the controller so as to obtain at least one predictive rule for accessing the storage device includes performing the anomaly detection to the command logs to obtain a plurality of similar clusters; obtaining a predictive threshold from each similar cluster; and comparing the predictive thresholds to obtain at least one predictive rule.

In an embodiment of the disclosure, the step of sending the policy data to the data transmission interface via the controller further includes that a firewall layer structure corresponding to the data transmission interface is constructed based on the policy data, wherein the firewall layer structure includes a network layer, a schematic layer and a semantic layer. The abnormality predicting method further includes that the controller executes a syntactic analysis to the command logs to obtain a parse tree of each command log, then executes a semantic analysis to the parse tree of each command log to obtain role labeling so as to establish the policy data according to the role labeling.

In the disclosure, an abnormality predicting system includes a data transmission interface coupled to a storage device, and an abnormality predicting apparatus coupled to the data transmission interface. The abnormality predicting apparatus includes a storage unit and a database storing a plurality of command logs; a controller coupled to the storage unit, wherein the controller analyzes the command logs to obtain at least one predictive rule for accessing the storage device. The controller performs the anomaly detection to the command logs based on at least one predictive rule to obtain a command cluster. The controller establishes a policy data corresponding to the predictive rule based on one or more command logs in each command cluster, wherein the controller sends the policy data to the data transmission interface such that the data transmission interface obtains a processing action for a received data access command according to the policy data.

In the disclosure, the abnormality predicting apparatus includes a storage unit and a controller coupled to the storage unit. The storage unit comprising a plurality of modules and a database. The database stores a plurality of command logs, and the controller executes the modules to implement the abnormality predicting method. The modules include a behavior predicting module which analyzes the command logs to obtain the at least one predictive rule for accessing the storage device; a policy generating module which performs the anomaly detection to the command logs based on the predictive rule to obtain at least one command cluster, and establishes a policy data corresponding to the predictive rule based on one or more command logs in each command cluster; and a transmitting module which transmits the policy data to the data transmission interface such that the data transmission interface obtains a processing action for the received data access command according to the policy data, wherein the data transmission interface is coupled to the storage device.

Based on the above, in the disclosure, the controller analyzes the command logs to establish the policy data, and sends the policy data to the data transmission interface such that the data transmission interface determines the processing action for the received data access command according to the policy data. Accordingly, a mechanism with intelligence analyzing function can be obtained, in which a controlling layer performs analysis so as to obtain the policy data according to the predictive rule and implement the firewall function in the data transmission interface.

In order to make the aforementioned features and advantages of the disclosure more comprehensible, embodiments accompanying figures are described in detail below.

DESCRIPTION OF EMBODIMENTS

Figure 1:
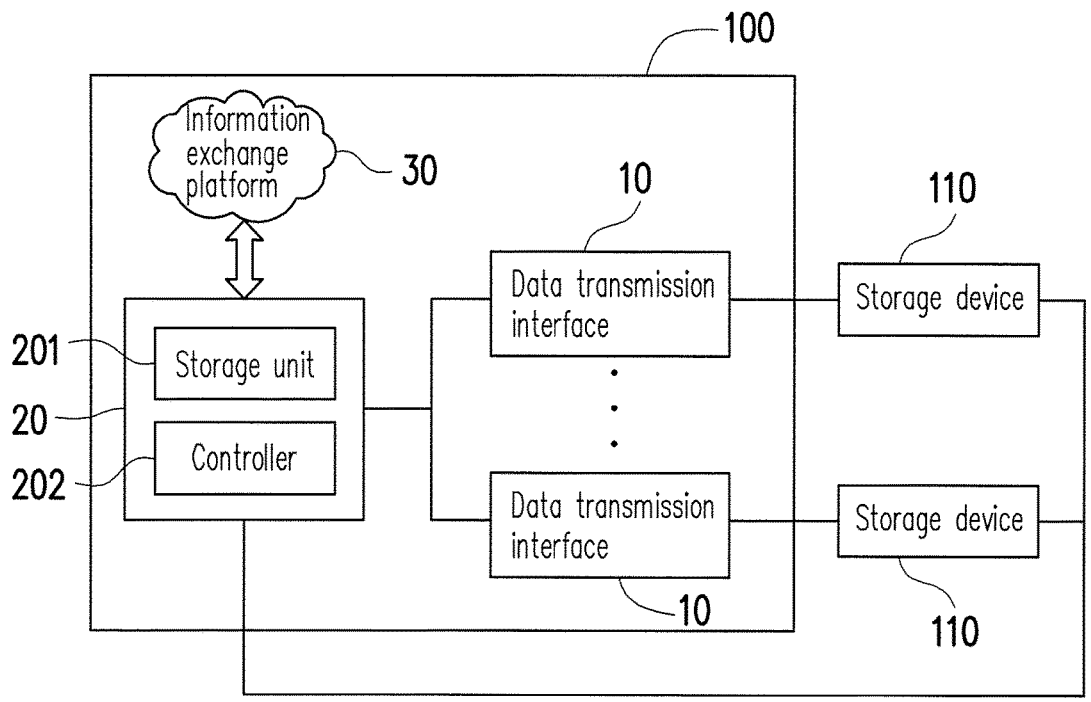
FIG. 1 is a block view illustrating an abnormality predicting system according to an embodiment of the disclosure.

FIG. 1 is a block view illustrating an abnormality predicting system according to an embodiment of the disclosure. Referring to FIG. 1, an abnormality predicting system 100 includes a data transmission interface 10 and an abnormality predicting apparatus 20. Here, the number of the data transmission interface 10 may be one or more. The abnormality predicting apparatus 20 may be coupled to the data transmission interface 10 in a wired or wireless manner.

In the embodiment, each data transmission interface 10 is coupled to the storage device 110. The data transmission interface 10 may be implemented via hardware and disposed in any electronic apparatus. In other embodiment, the data transmission interface 10 may also be disposed in the storage device 110. In addition, the data transmission interface 10 may be implemented via software. The storage device 110 may consist of one or more hardware storage units, and the storage device 110 may be further divided into a plurality of storage spaces. The storage device 10 may be coupled to the abnormality predicting apparatus 20 in a wired or wireless manner. The storage device 110 may be, for example, a network storage server and may be applied in various storage formats such as database, repository, table and field.

Here, the data transmission interface 10 is configured as an intermediate layer between the abnormality predicting apparatus 20 and the storage device 10, which may be a storage adapter or a proxy. The data transmission interface 10 may record one or more policy data to be used by the storage space in the storage device 110. The function of the firewall is realized by recording the policy data in the data transmission interface 10, related details are described below.

The storage device 110 may be a software-defined storage system or a software-defined database. The storage device 110 includes one or more storage spaces, and one storage space may correspond to one or more policy data. The policy data corresponding to different storage spaces may be identical or different. In addition, the size of the storage space may be determined depending on data transmission bandwidth.

The abnormality predicting apparatus 20 is, for example, an electronic apparatus such as a server, a personal computer, a notebook computer, a tablet PC, a smart phone that have computing capability. The abnormality predicting apparatus 20 generates policy data according to a plurality of command logs. The command logs include a command log returned by the data transmission interface 10 or the storage device 110, and may include a command log provided by an external data exchange platform 30. The command log of the data exchange platform 30 may be shared by the manufacturer or other users.

The abnormality predicting apparatus 20 includes a storage unit 201 and a controller 202. The controller 202 is, for example, a central processing unit (CPU), a microprocessor, an embedded controller chip, a digital signal processor (DSP), an application specific integrated circuit (ASIC), or the like. The storage unit 201 is, for example, a non-volatile memory, a random access memory (RAM) or a hard disk.

Figure 2:
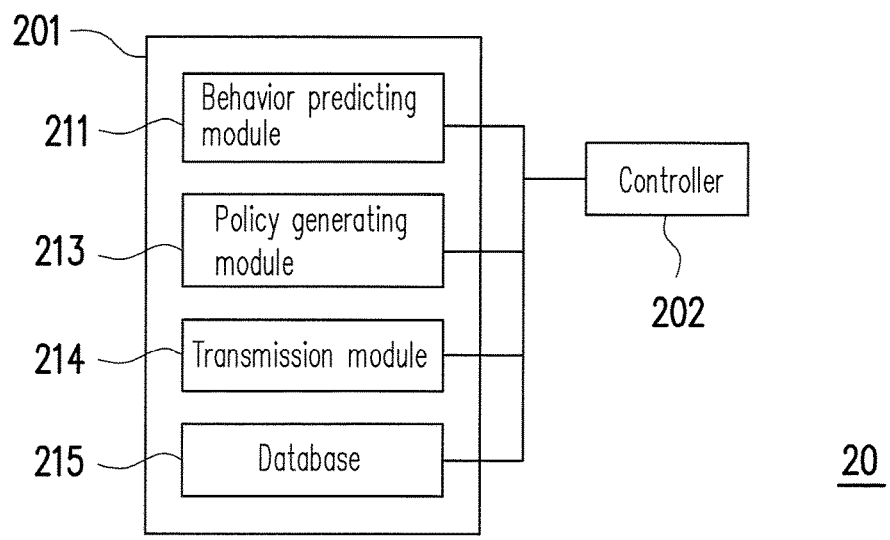
FIG. 2 is a block view illustrating an abnormality predicting apparatus according to an embodiment of the disclosure.

FIG. 2 is a block view illustrating an abnormality predicting apparatus according to an embodiment of the disclosure. Referring to FIG. 2, a controller 202 is coupled to a storage unit 201. In the embodiment, the abnormality predicting method is implemented via a program code. That is to say, the storage unit 201 stores a plurality of program code segments. The program code segments are executed by the controller 202 after being installed so as to implement the abnormality predicting method. Here, the storage unit 201 includes a plurality of modules, and each module consists of one or more program code segments. The modules include a behavior predicting module 211, a policy generating module 213 and a transmission module 214. In addition, the storage unit 201 further includes a database 215. The database 215 stores a plurality of command logs. The command logs are returned by the data transmission interface 10 or storage device 110, or may be provided by an external information exchange platform 30. In other embodiments, the modules may be realized via a hardware processor or one or more logic gate chips.

The behavior predicting module 211 analyzes the command logs in the database 215 so as to obtain a predictive rule for accessing the storage device 110. The policy generating module 213 performs the anomaly detection to the command logs according to the predictive rule so as to obtain a command cluster that meets the predictive rule, and establishes a policy data corresponding to the predictive rule according to one or more command logs in each command cluster. For example, one predictive rule corresponds to one policy data. The transmission module 214 transmits the policy data to the data transmission interface 10, such that the data transmission interface 10 obtains a processing action for the received data access command according to the policy data.

Figure 3:
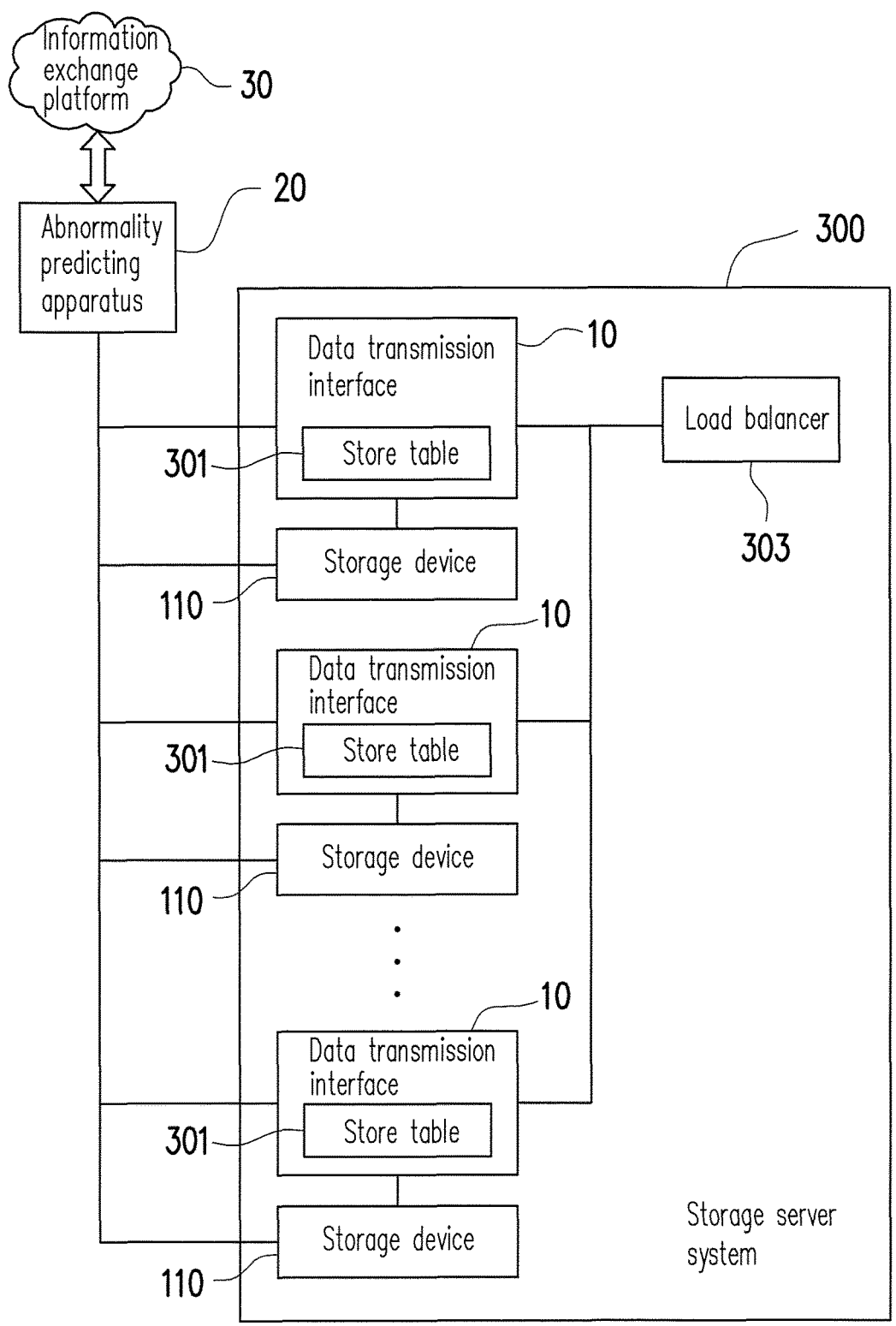
FIG. 3 is a block view illustrating a software-defined storage (SDS) structure according to an embodiment of the disclosure.

FIG. 3 is a block view illustrating a software-defined storage (SDS) structure according to an embodiment of the disclosure. The SDS structure virtualizes an underlayer hardware via a virtual data platform and withdraws the storage management function such that different storage arrays may be managed in a completely identical manner. Referring to FIG. 3, in the SDS structure, a management layer (i.e. the abnormality predicting apparatus 20) and the data layer (i.e. a storage server system 300) are separated from each other.

The storage server system 300 includes a load balancer 303, a plurality of data transmission interface 10 and a plurality of storage devices 110. Each data transmission interface 10 is coupled to at least one corresponding storage device 110. Here, each data transmission interface 10 has a store table 301. The firewall of the SDS structure is realized via the configuration of the store table 301 and communicated with the data transmission interface 10 via the controller 202 so as to write the policy data into the store table 301. The load balancer 303 receives the data access command and sends the data access command to one or more designated data transmission interface 10 according to an instruction in the data access command and the load balancing characteristic.

Figure 4:
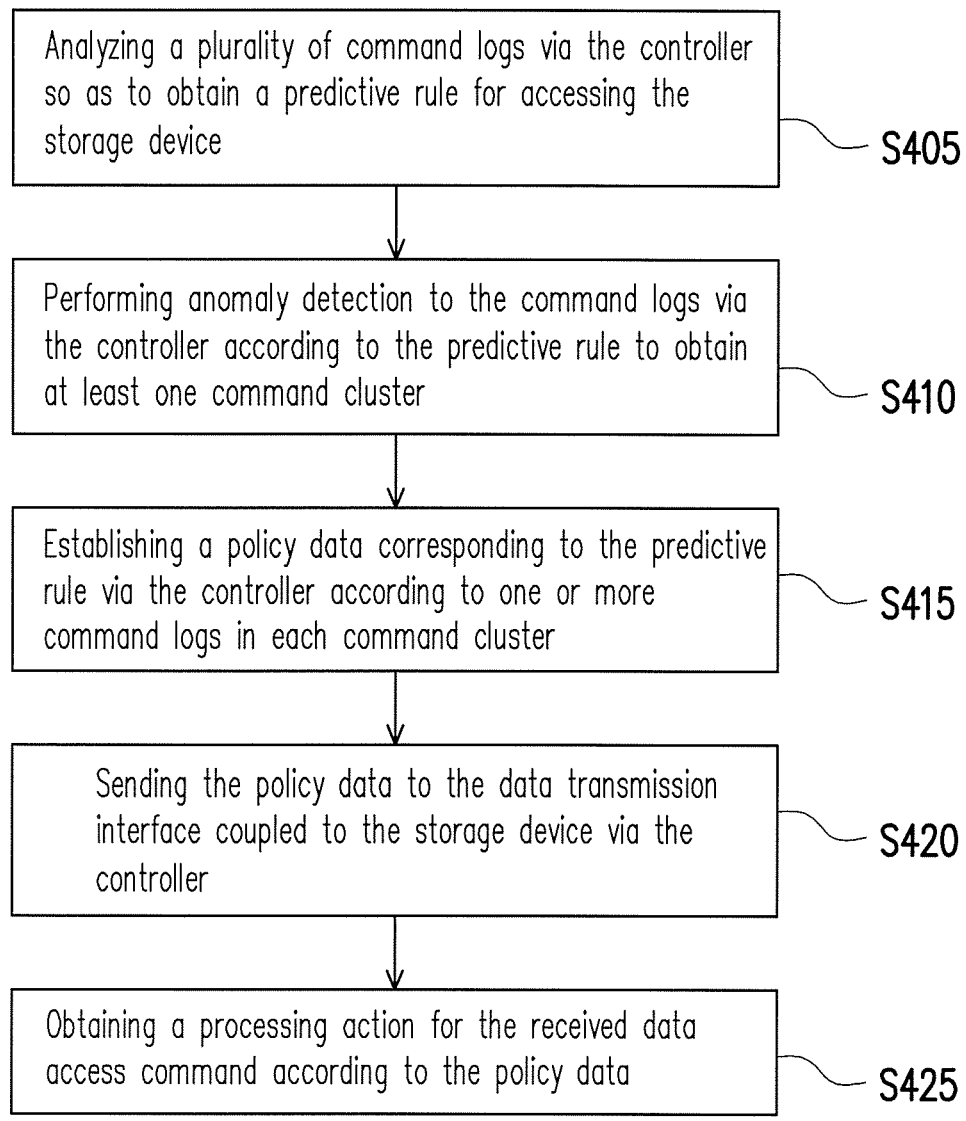
FIG. 4 is a flowchart illustrating an abnormality predicting method according to an embodiment of the disclosure.

The steps of abnormality predicting method are described in details below accompanying with the hardware structure. FIG. 4 is a flowchart illustrating an abnormality predicting method according to an embodiment of the disclosure. Referring to FIGS. 1-4, in step S405, a plurality of command logs are analyzed via the controller 202 so as to obtain a predictive rule for accessing the storage device 110. The controller 202 analyzes the user's behavior via the collected command logs stored in the database 215 so as to predict possible circumstances where abnormality occurs.

Here, the controller 202 classifies command logs that record similar behaviors into the same cluster (similar cluster) via an anomaly detection. Here, the anomaly detection is performed by applying the deviation based outlier detection algorithm to the association rule algorithm and the frequent itemset algorithm. The deviation based outlier detection algorithm is, for example, a sequence anomaly algorithm which is performed in the manner that, after a series of similar data is obtained, an element that disturbs the series is considered an exception. A set S having $n^{th}$ elements is provided to establish a subset sequence $Sj=\{S1, S2, \ldots, Sm\}$, wherein $2 \leq m \leq n$ and $Sj-1 \subset Sj$, $Sj \subseteq S$. Next, comparisons are made between every subset to compare the difference between the subset and the preceding subset. In the meantime, a smoothing factor is employed to determine which set is abnormal. The smoothing factor is defined as the degree of reduced difference when one subset is removed from the raw data.

In addition, it may be determined which similar clusters may be normal and which similar clusters may be abnormal according to the number of command log included in each similar cluster. For example, the similar cluster that includes the most command logs represents that the most actions are the same. Generally speaking, there are few abnormal commands in the collected command logs. Therefore, the similar cluster that has the least command logs may be an abnormal cluster. Accordingly, the controller 202 may obtain a corresponding predictive rule based on the plurality of similar clusters. For example, the controller 202 obtains the predictive threshold of each of the similar clusters and compares the predictive thresholds to obtain the predictive rule.

Here, the predictive rule is, for example, congestion threshold, repeat request threshold, illegal access threshold and so son. The congestion threshold refers to a sum of commands that can be accepted in a period of time. The repeat request threshold refers to a sum of times of repeatedly requesting data package (command) that can be accepted in a period of time when the data package is lost. The illegal access threshold refers to the sum of illegal access commands that can be executed by a specific user in a period of time.

The numeral range of the predictive rule such as the congestion threshold, repeat request threshold and illegal access threshold can be obtained, for example, through the following means. The predictive thresholds represented by each similar cluster are calculated and compared to obtain a set of representative numeral range. For example, the numeral range that is the least similar to other numeral ranges of others clusters is set as the predictive rule. Assuming that similar clusters A, B, C and D are obtained, and the predetermined thresholds are ranges a, b, c and d. If range d is the least similar to ranges a, b and c, it can be determined that similar cluster D is an abnormal cluster, and the predictive rule can be obtained based on the range d. The clusters A, B and C that have higher similarities may be determined as normal clusters, and the predictive rule can be obtained based on ranges a, b and c.

Next, in step S410, based on the above predictive rule, the controller 202 performs the anomaly detection to the command logs to obtain the command cluster. For example, the command cluster that meets the predictive rule is obtained based on the above predictive rule by using K-means algorithm or K-nearest neighbors (KNN) algorithm.

In step S415, the controller establishes a policy data corresponding to the predictive rule according to one or more command logs in each command cluster. The policy data is at least one of, for example, access authority, access frequency, access quantity or a combination thereof, which should not be construed as a limitation to the disclosure. Examples 1 and 2 are provided below for describing how policy data is established.

In Example 1, the controller 202 may predict a large amount of frequent reading and writing occurs in a period of time through the data analysis in step S405, therefore the controller 202 establishes the policy data and thereby executes the reading and writing commands separately during the period of time, so as to distribute network traffic flow.

The controller 202 sets the predictive rule (e.g. one or more suitable thresholds) through analyzing the command logs in the database 215, and establishes the policy data according to the predictive rule.

Specifically, the controller 202 sets a reasonable numeral range for the congestion threshold and repeat request threshold through the data analysis in step S405. Thereafter, the controller 202 performs the anomaly detection to the cumulative command logs in the database 215 according to the congestion threshold and the repeat request threshold so as to obtain the required command cluster. In terms of the K-means algorithm, first of all, a lower K value (set based on experience value) is determined as differentiation. Next, an average value or variance of the congestion threshold and repeat request threshold is calculated to be used as a standard for dividing a more suitable clusters (command cluster) so as to divide more suitable clusters from the current single cluster by employing the average value and variance. The above actions are repeated until the clusters have higher similarities inside. The command logs that are not divided into the command clusters are determined as abnormal.

In Example 2, the controller 202 may know which source address often executes illegal reading and writing commands through the data analysis in step S405. Accordingly, the controller 202 establishes the policy data and thereby sets the source address into a black list and performs comparison or update with the information exchange platform 30 so as to block the reading and writing commands when the source address is detected.

Specifically, the controller 202 sets the illegal access threshold through the data analysis in step S405. Thereafter, the controller 202 performs the anomaly detection to the cumulative command logs in the database 215 according to the illegal access threshold. The data that cannot be classified into the cluster (command cluster) is determined as abnormal. In terms of the K-means algorithm, first of all, a lower K value (set based on experience value) is determined as differentiation. Next, the illegal access threshold is used as a standard for dividing a more suitable cluster (command cluster). The above actions are repeated until the clusters have higher similarities inside (e.g. the similarity is higher than the predetermined value). The command logs that are not divided into the command clusters are determined as abnormal.

After the policy data is established, in step S420, the controller 202 sends the policy data to the data transmission interface 10 coupled to the storage device 110. Here, the data transmission interface 10 converts the policy data into a format that complies with the store table 301 so as for the policy data to be written into the store table 301.

Thereafter, in step S425, the data transmission interface 10 obtains the processing action for the received data access command according to the policy data. The processing action is, for example, an active action, a filter action or a block action. The active action refers to executing the data access command directly. The filter action refers to adjusting the data access command. The block action refers to block execution of the data access command. After receiving the security policy, the data transmission interface 10 further converts the security policy into a format that complies with the store table 301 so as for the security policy to be written into the store table 301.

Figure 6:
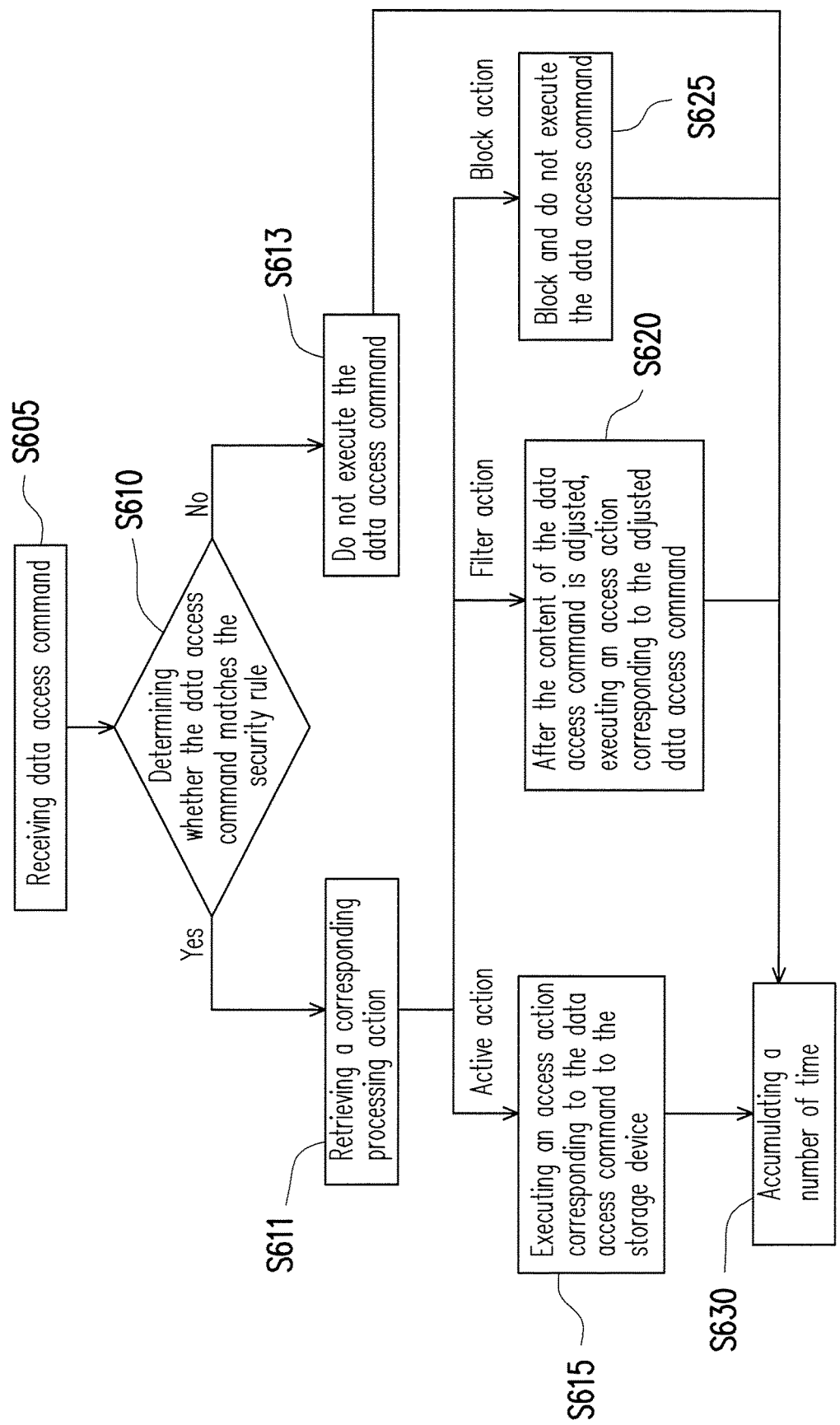
FIG. 6 is a flowchart illustrating a command matching method according to an embodiment of the disclosure.

FIG. 6 is a schematic view illustrating a store table according to an embodiment of the disclosure. In the embodiment, the policy data includes a security rule and a corresponding processing action. After receiving the policy data, the data transmission interface 10 converts the policy data into a format that complies with the store table 301 so as for the security rule and the processing action to be written into corresponding fields.

Figure 5:
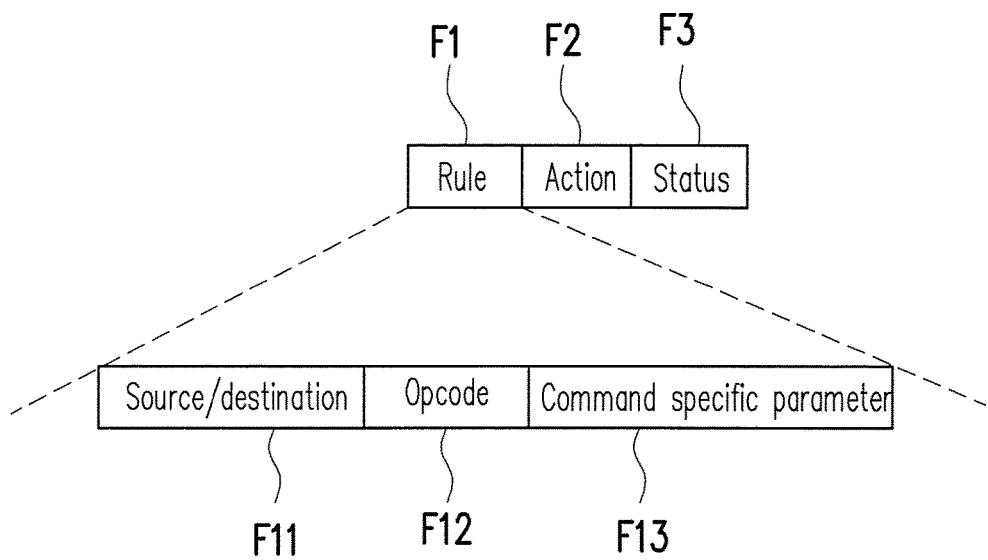
FIG. 5 is a schematic view illustrating a store table according to an embodiment of the disclosure.

Referring to FIG. 5, the store table 301 includes three fields, namely, a rule field F1, an action field F2, and a status field F3. After obtaining the policy data, the data transmission interface 10 writes the security rule into the rule field F1, and writes the processing action into the action field F2. The processing action is, for example, an active action, a filter action or a block action. The rule field F1 includes a source/destination field F11, an opcode field F12 and a command specific parameter field F13. The source/destination field F11 records the source address and destination address of the data access command. The opcode field F12 records the opcode of the execution action of the data access command. In the case where the data access command is an SCSI command, the opcode recorded in the opcode field F12 is, for example, reading and writing actions and the like. In the case where the data access command is an XQuery command, the opcode recorded in the opcode field F12 is, for example, an FLWOR formulation, an insert action, a delete action, a replace action, a rename action, or a transform action. The command specific parameter field F13 records the parameter of the content of the opcode, and the field is an indefinite length which is subject to the opcode. The action field F2 records the processing action. The status field F3 records the number of times that the data transmission interface 10 receives the data access command. The format of the store table 301 described above is just for ease of description and should not be construed as a limitation to the disclosure.

In the embodiment, when the processing action corresponding to the matched security rule is the filter action or block action, the data access command is determined as abnormal. When the processing action corresponding to the matched security rule is the active action, the data access command is determined as normal. Under the circumstances where the processing action is the active action, the data transmission interface 10 directly executes the access action corresponding to the data access command. Under the circumstances where the processing action is the filter action, the data transmission interface 10 adjusts the content of the data access command and then executes the access action corresponding to the adjusted data access command. Under the circumstances where the processing action is the block action, the data transmission interface 10 isolates the data access command, that is, blocking the execution of the data access command.

In addition, in other embodiments, the security rule of the policy data may also be employed for simply defining whether the data access command is lawful, and the corresponding action field F2 records the abnormality preventing action (e.g. block action or filter action) that is executed under the circumstances where the data access command is determined as illegal (abnormal). For example, when the data access command is determined as normal when it matches the security rule, the access action corresponding to the data access command is directly executed. When the data access command does not match the security rule, it is determined as abnormal. Under the circumstances where the corresponding abnormality preventing action is the filter action, the data access command is adjusted. Under the circumstances where the corresponding abnormality preventing action is the block action, the data access command is blocked.

An embodiment is provided below to describe the flow of command matching in the data transmission interface 10.

FIG. 6 is a flowchart illustrating a command matching method according to an embodiment of the disclosure. Referring to FIG. 1 to FIG. 6, in step S605, the data transmission interface 10 receives the data access command from the load balancer 303. Here, the data access command is, for example, a universal interface command such as a small computer system interface (SCSI) command. The data access command may also be a query language command such as XML query (XQuery) command. When the data access command enters the data transmission interface 10, the data transmission interface 10 executes a corresponding processing action to the received data access command according to the store table 301.

Here, each storage device 110 may be partitioned into a plurality of storage spaces. The size of the storage space may be determined depending on the data transmission bandwidth. The number of accumulated times that the data access commands are received may be calculated to determine whether the data transmission bandwidth reaches the minimum transmission rate.

Thereafter, in step S610, the data transmission interface 10 determines whether the data access command matches the security rule in the store table 301. If the received data access command does not match any security rule, the block action is executed in step S613; that is, the data access command is not executed. If the received data access command matches the security rule, in step S611, the data transmission interface 10 reads the action field F2 corresponding to the matched security rule so as to obtain the corresponding processing action.

If the processing action is the active action, as shown by step S615, the data transmission interface 10 directly executes the access action corresponding to the data access command to the storage device 110. If the processing action is the filter action, as shown by step S620, after adjusting the content of the data access command, the data transmission interface 10 executes the access action corresponding to the adjusted data access command to the storage device 110. If the processing action is the block action, as shown by step S625, the data transmission interface 10 isolates the data access command so as to block the execution of the data access command. In addition, if the processing action is the block action, the data transmission interface 10 may further forward the data access command to the controller 202 or another data transmission interface.

For example, the policy data defined in the opcode field F2 of the store table 301 is that only read action is permitted and write action is not permitted, i.e. opcode=READ, action=PASS; opcode=WRITE, action=BLOCK. Here, the opcode field F12 of one of the security rules records "READ" (representing read action), and the corresponding action field F2 records "PASS" (representing active action). The opcode field F12 of another security rule records "WRITE" (representing write action), and the corresponding action field F2 records "BLOCK" (representing block action). Accordingly, if the execution action for the received data access command is the write action (e.g. opcode=WRITE, action=PASS), and the obtained corresponding processing action is "action=BLOCK" after comparing with the security rule, step S625 is performed and the data access command is not executed (blocked); meanwhile, the data access command is forwarded to the controller 202. Also, after receiving the data access command, the controller 202 may further issue a warning and generates a report.

No matter whether the data access command matches the security rule, the step S630 is performed. In step S630, the data transmission interface 10 accumulates the number of times into the corresponding receiving records, and sends the receiving records to the controller 202 such that the controller 202 updates the database 215 and updates the policy data according to the updated database 215. For example, the number of times may be recorded in the status field F3 of the store table 301 compared with the data access command.

That is to say, when the data access command enters the data transmission interface 10, the data transmission interface 10 compares the security rules in the store table 301. If the data access command matches the security rule, the data transmission interface 10 determines whether the access action corresponding to the data access command is executed based on the corresponding processing action, and the number of times is accumulated. The number of times is also accumulated when there is no match. Accordingly, the amount of data access command received in a period of time may be calculated, and the policy data may be further updated based on the number of times.

For example, in the case where the maximum congestion threshold initially set by the policy data is 5 times/10 sec. Assuming that 10 data access commands are received from a source address a within ten seconds, the top 5 data access commands are executed and the $6^{th}$ data access command and subsequent data access commands are not executed. After the receiving record is returned to the controller 202, the controller 202 updates the policy data, for example, by directly blocking the source address aa and rejecting the data access command transmitted via the source address aa. However, the above descriptions are provided as an example only, which should not be construed as a limitation to the disclosure.

Under the circumstances where the storage device 110 is a software-defined database, and the data access command is an XQuery command, a firewall layer structure corresponding to the data transmission interface 10 (proxy) is constructed based on the policy data, which includes a network layer, a schematic layer and a semantic layer. The network layer mainly provides a stateful firewall and denial-of-service (DoS) prevention. The stateful firewall is configured to monitor whether the Internet protocol address at the client's end is a permitted address. For example, a white list (permitted command), a black list (command to be blocked), or an exception list (may be used to overwrite the white list or black list) and the like may be further configured in the store table 301 according to the policy data.

In the schematic layer, dynamic profiling is employed to identify the data access mode adopted by general users. The controller 202 establishes the policy data based on behavior abnormality prediction, which establishes a baseline of all the user's activities, including data definition language (DDL), data manipulation language (DML), data control language (DCL), read-only activity (SELECTs) and use of storage process. In the schematic layer, in the case where the user executes an unexpected query or violates the policy of access, and a warning is issued or the access is blocked, the data transmission interface 10 identifies the data difference. The user-end that executes an unauthorized request to the database is blocked as well until the access right of the user-end is examined and permitted.

In the semantic layer, the controller 202 executes syntactic analysis to the command log (e.g. XQuery command) so as to obtain the parse tree of each command log, and executes semantic analysis to the parse tree of each command log so as to obtain role labeling, based on which it can be determined whether to block or adjust any malicious role, and the policy data can be generated accordingly.

In the store table 301 of the firewall layer structure, the corresponding data transmission interface 10 transforms the original query language into the XQuery command after receiving the data access command. After steps S610 to S630 are performed, the XQuery command is transformed backed to the original query language. In addition, the implementation of the above firewall layer structure is also adaptable for the SCSI command.

In summary, in the disclosure, the controller analyzes the command logs to establish the policy data, and sends the policy data to the data transmission interface, such that the data transmission interface determines the processing action for the received data access command according to the policy data. Based on the above, the controller may achieve the intelligence analysis mechanism, and conduct analysis so as to obtain the policy data based on the predictive rule so as to realize the function of the firewall in the data transmission interface.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. An abnormality predicting method, comprising:
   analyzing a plurality of command logs via a controller so as to obtain at least one predictive rule for accessing a storage device;
   performing an anomaly detection to the command logs via the controller according to the at least one predictive rule so as to obtain at least one command cluster;
   establishing at least one policy data corresponding to the at least one predictive rule via the controller according to one or more command logs in each of the at least one command cluster;
   sending the at least one policy data via the controller to a data transmission interface coupled to the storage device; and
   obtaining a processing action for a received data access command via the data transmission interface according to the at least one policy data.

2. The abnormality predicting method according to claim 1, wherein each of the at least one policy data comprises a security rule and the corresponding processing action;
   wherein the step of obtaining the processing action for the received data access command via the data transmission interface according to the at least one policy data comprises:
   retrieving the processing action corresponding to the security rule matched with the data access command.

3. The abnormality predicting method according to claim 2, wherein after the step of sending the at least one policy data via the controller to the data transmission interface coupled to the storage device further comprises:
   transforming the at least one policy data via the data transmission interface into a format compliant with a store table of the data transmission interface so as to write the at least one policy data to the store table, wherein the step of writing each of the at least one policy data into the store table comprises:
   writing the security rule into a rule field; and
   writing the processing action into an action field, wherein the store table further comprises a status field, the status field recording a number of times that the data transmission interface receives the data access command.

4. The abnormality predicting method according to claim 3, further comprising:
   after the data transmission interface receives the data access command, accumulating the number of times into the corresponding status field via the data transmission interface, and forwarding the number of times to the controller such that the controller updates the at least one policy data.

5. The abnormality predicting method according to claim 2, wherein the step of obtaining the processing action for the received data access command via the data transmission interface according to the at least one policy data comprises:
   determining whether the received data access command matches the security rule via the data transmission interface;
   if the received data access command does not match any security rule, executing a block action to the data access command; and
   if the received data access command matches the security rule, obtaining the processing action corresponding to the security rule via the data transmission interface.

6. The abnormality predicting method according to claim 1, wherein after the step of obtaining the processing action for the received data access command via the data transmission interface according to the at least one policy data, further comprising:
   if the processing action is an active action, executing an access action corresponding to the data access command to the storage device via the data transmission interface;
   if the processing action is a filter action, executing an access action corresponding to an adjusted data access command to the storage device, after adjusting the content of the data access command via the data transmission interface; and
   if the processing action is a block action, isolating the data access command via the data transmission interface such that the data transmission interface blocks execution of the data access command.

7. The abnormality predicting method according to claim 6, wherein if the processing action is the block action, further comprising:
   forwarding the data access command to the controller or another one data transmission interface via the data transmission interface.

8. The abnormality predicting method according to claim 1, wherein the storage device comprises a plurality of storage spaces, and each of the storage spaces has at least one corresponding policy data.

9. The abnormality predicting method according to claim 1, wherein the step of analyzing the command logs via the controller so as to obtain the at least one predictive rule for accessing the storage device comprises:
   executing the anomaly detection to the command logs so as to obtain a plurality of similar clusters;
   obtaining a predictive threshold from each of the similar clusters; and
   comparing the predictive thresholds to obtain the at least one predictive rule.

10. The abnormality predicting method according to claim 1, wherein the step of sending the at least one policy data to the data transmission interface via the controller further comprises:
    constructing a firewall layer structure corresponding to the data transmission interface according to the at least one policy data, wherein the firewall layer structure comprises a network layer, a schematic layer and a semantic layer;

wherein the abnormality predicting method further comprises:

executing a syntactic analysis to the command logs via the controller so as to obtain a parse tree of each of the command logs, and executing a semantic analysis to the parse tree of each of the command logs so as to obtain a role labeling, and establishing the at least one policy data according to the role labeling.

11. An abnormality predicting system, comprising:
a data transmission interface coupled to a storage device; and
an abnormality predicting apparatus coupled to the data transmission interface, the abnormality predicting apparatus comprises:
  a database storing a plurality of command logs; and
  a controller coupled to the database, wherein the controller analyses the command logs so as to obtain at least one predictive rule for accessing the storage device; the controller performs an anomaly detection to the command logs according to the at least one predictive rule so to obtain at least one command cluster; the controller establishes at least one policy data corresponding to the at least one predictive rule according to one or more command logs in each of the at least one command cluster;
wherein the controller sends the at least one policy data to the data transmission interface such that the data transmission interface obtains a processing action for a received data access command according to the at least one policy data.

12. The abnormality predicting system according to claim 11, wherein each of the at least one policy data comprises a security rule and the corresponding processing action;
after receiving the policy data, the data transmission interface transforms the at least one policy data into a format compliant with a store table of the data transmission interface so as to write the policy data into the store table, the store table comprising:
a rule field recording the security rule;
an action field recording the processing action; and
a status field recording a number of times that the data transmission interface receives the data access command.

13. The abnormality predicting system according to claim 12, wherein, after receiving the data access command, the data transmission interface determines whether the received data access command matches the security rule recorded in the rule field; if the received data access command does not match any security rule, a block action is executed to the data access command; if the received data access command matches the security rule, the data transmission interface reads the corresponding action field so as to obtain the processing action.

14. The abnormality predicting system according to claim 12, wherein, after receiving the data access command, the data transmission interface accumulates the number of times into corresponding the status field and forwards the number of times to the controller such that the controller updates the policy data.

15. The abnormality predicting system according to claim 11, wherein
if the processing action is an active action, the data transmission interface executes an access action corresponding to the data access command to the storage device;
if the processing action is a filter action, after the data transmission interface adjusts the content of the data access command, the data transmission interface executes an access action corresponding to the adjusted data access command to the storage device; and
if the processing action is a block action, the data transmission interface isolates the data access command such that the data transmission interface blocks execution of the data access command.

16. The abnormality predicting system according to claim 15, wherein if the processing action is the block action, the data transmission interface forwards the data access command to the controller or another one data transmission interface.

17. The abnormality predicting system according to claim 11, wherein the storage device comprises a plurality of storage spaces, and each of the storage spaces has at least one corresponding policy data.

18. The abnormality predicting system according to claim 11, wherein the controller executes the anomaly detection to the command logs to obtain a plurality of similar clusters; obtains a predictive threshold from each of the similar clusters; and compares the predictive thresholds so as to obtain the at least one predictive rule.

19. The abnormality predicting system according to claim 11, wherein the data transmission interface comprises a firewall layer structure, the firewall layer structure comprises a network layer, a schematic layer and a semantic layer;
wherein the controller executes a syntactic analysis to the command logs so as to obtain a parse tree of each of the command logs, and executes a semantic analysis to the parse tree of each of the command logs to obtain a role labeling, and establishes the policy data according to the role labeling.

20. An abnormality predicting apparatus, comprising:
a storage unit comprising a plurality of modules and a database, wherein the database stores a plurality of received command logs;
a controller coupled to the storage unit and executing the modules to implement an abnormality predicting method,
wherein the modules comprise:
a behavior predicting module analyzing the command logs so as to obtain at least one predictive rule for accessing a storage device;
a policy generating module performing an anomaly detection to the command logs according to the at least one predictive rule so as to obtain at least one command cluster, and establishing at least one policy data corresponding to the at least one predictive rule according to one or more command logs in each of the at least one command cluster; and
a transmission module sending the at least one policy data to a data transmission interface such that the data transmission interface obtains a processing action for a received data access command according to the at least one policy data, wherein the data transmission interface is coupled to the storage device.

* * * * *